United States Patent [19]
Sasaki

[11] Patent Number: 6,031,678
[45] Date of Patent: Feb. 29, 2000

[54] REPRODUCING APPARATUS SETTABLE IN A SEARCH REPRODUCTION MODE FROM OPERATION IN A NORMAL REPRODUCTION MODE

[75] Inventor: Yoshiyuki Sasaki, Kanagawa-ken, Japan

[73] Assignee: Canon Kabushiki Kaisha, Tokyo, Japan

[21] Appl. No.: 08/901,251

[22] Filed: Jul. 28, 1997

Related U.S. Application Data

[63] Continuation of application No. 08/440,895, May 15, 1995, abandoned.

[30] Foreign Application Priority Data

May 23, 1994 [JP] Japan .................................. 6-108446

[51] Int. Cl.[7] .................................................. G11B 15/46
[52] U.S. Cl. .................... 360/73.06; 360/51; 360/73.05; 386/80; 386/81
[58] Field of Search ................................ 360/10.1, 10.2, 360/10.3, 51, 53, 64, 65, 73.04, 73.05, 73.06; 386/6, 68, 69, 81, 85, 86, 70, 78–80, 82

[56] References Cited

U.S. PATENT DOCUMENTS

| | | | |
|---|---|---|---|
| 4,811,128 | 3/1989 | Ono et al. | 360/73.12 |
| 5,003,411 | 3/1991 | Nagahara et al. | 360/72.2 |
| 5,045,956 | 9/1991 | Ejima | 360/51 |
| 5,157,355 | 10/1992 | Shikakura et al. | 331/11 |
| 5,335,122 | 8/1994 | An | 360/73.01 |

Primary Examiner—Aristotelis M. Psitos
Assistant Examiner—Dan I. Davidson
Attorney, Agent, or Firm—Robin, Blecker & Daley

[57] ABSTRACT

A reproducing apparatus having a phase-locked loop for controlling recording medium transport has selectable normal and search reproduction modes and is settable to the search reproduction mode upon an output of the phase-locked loop obtained in operation of the apparatus in the normal reproduction mode.

16 Claims, 9 Drawing Sheets

REPRODUCING APPARATUS SETTABLE IN A SEARCH REPRODUCTION MODE FROM OPERATION IN A NORMAL REPRODUCTION MODE

This is a continuation application under 37 CFR 1.62 of prior application Ser. No. 08/440,895, filed May 15, 1995 and now abandoned.

BACKGROUND OF THE INVENTION

1. Field of the Invention

This invention relates to a signal reproducing apparatus and more particularly to an apparatus such as a digital VTR or the like which is arranged to be capable of varying its reproducing speed.

2. Description of Related Art

Known apparatuses of the kind mentioned above include VTRs which record and/or reproduce video signals on or from magnetic tapes by using rotary heads.

Figure 1:
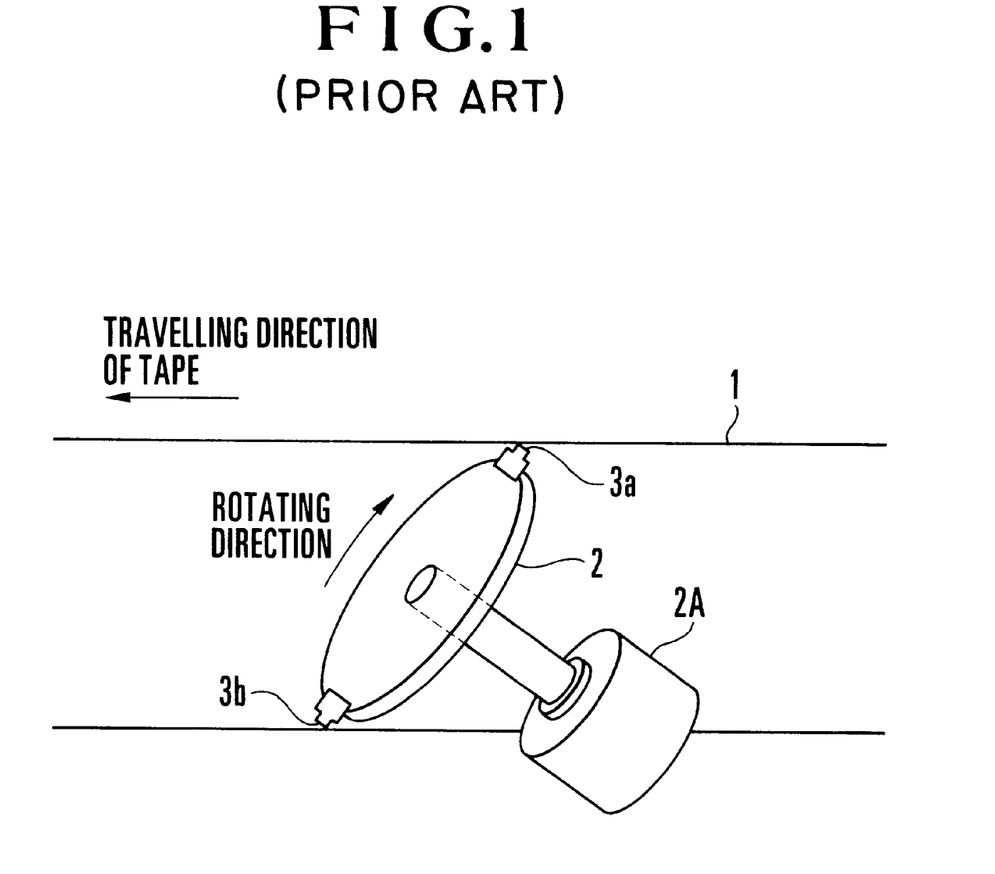
FIG. 1 shows the arrangement of rotary heads.

FIG. 1 shows the arrangement of a VTR of the above-stated kind. Referring to FIG. 1, magnetic heads 3a and 3b are mounted on a rotary drum 2 which is disposed in the neighborhood of a magnetic tape 1. A drum motor 2A is arranged to rotate the rotary drum 2 to cause the magnetic heads 3a and 3b to obliquely scan the surface of the magnetic tape 1 one after another.

Figure 2:
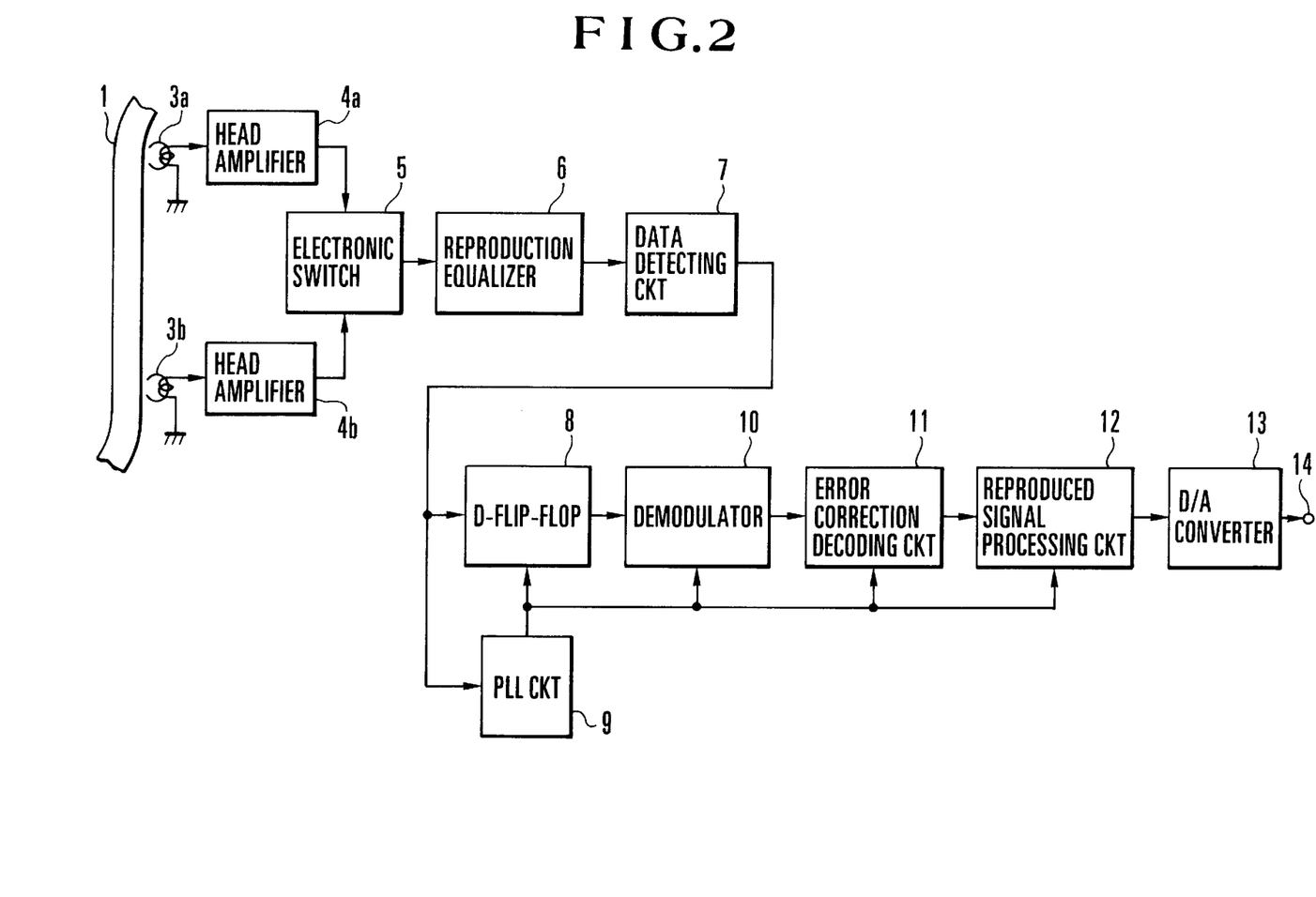
FIG. 2 is a block diagram showing by way of example the arrangement of a digital VTR.

A digital VTR which is arranged to record and/or reproduce a digital signal with rotary heads as mentioned above is next described as follows. FIG. 2 shows in a block diagram and by way of example the arrangement of the digital VTR using the rotary heads. Referring to FIG. 2, head amplifiers 4a and 4b are arranged to amplify signals reproduced respectively by the magnetic heads 3a and 3b. An electronic switch 5 is arranged to perform a switch-over action on the outputs of the head amplifiers 4a and 4b. A reproduction equalizer 6 is composed of an LC network having a predetermined frequency characteristic or the like. A data detecting circuit 7 is arranged to shape the waveform of an analog signal outputted from the reproduction equalizer 6 and to convert it again into the form of digital data. A D-flip-flop 8 is arranged to latch the digital data.

A PLL (phase-locked loop) circuit 9 is arranged to generate a clock signal which is phase-locked to the output, i.e., a reproduced digital signal, of the data detecting circuit 7 and to apply the clock signal to the D-flip-flop 8 and other subsequent circuits. Reference numeral 10 denotes a demodulator. An error correction decoding circuit 11 is arranged to make error correction by detecting any error included in the reproduced data. A reproduced signal processing circuit 12 is arranged to carry out a signal processing action on the reproduced signal which has been block-coded by DCT and compressed in amount of information. The signal processing action is carried out reversely to a signal processing action performed in recording, in such a way as to bring the reproduced digital signal back to its original form by expanding the amount of information. Reference numeral 13 denotes a D/A converter and reference numeral 14 an output terminal.

Figure 3:
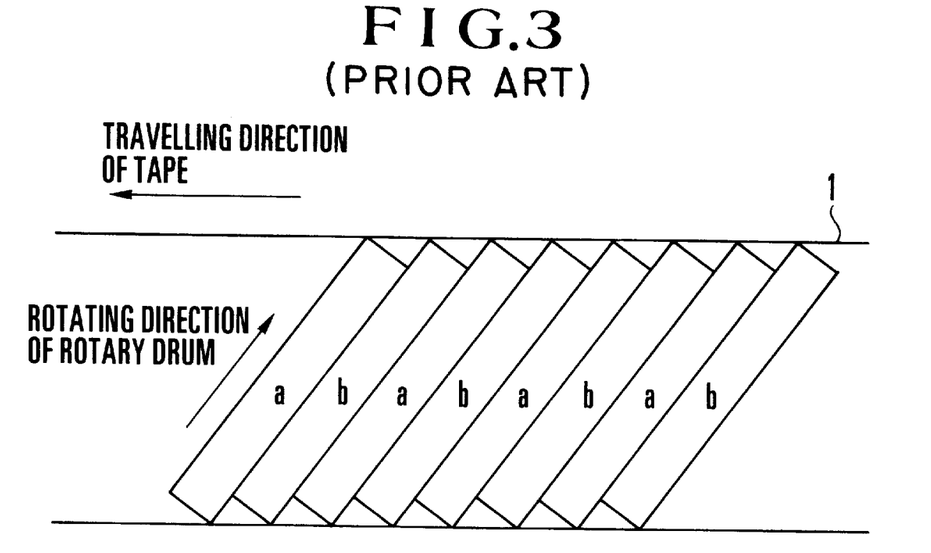
FIG. 3 shows signals recorded on the magnetic tape by the VTR which is arranged as shown in FIG. 2.

The digital VTR operates as follows. When the rotary drum 2 is rotated by the drum motor 2A, the magnetic heads 3a and 3b alternately read out recorded signals from the magnetic tape 1 on which tracks "a" and "b" are alternately recorded in a pattern as shown in FIG. 3. The reproduced signals which are read out in a minute state are amplified by the head amplifiers 4a and 4b to an extent between 50 and 60 dB. The outputs of the head amplifiers 4a and 4b are selected and combined into one signal through the electronic switch 5. The signal thus obtained has losses of varied kinds caused through the tape-head system. These losses are corrected by an equalizing action of the reproduction equalizer 6 which has such a frequency characteristic that emphasizes the low and high frequency bands of the signal.

The signal outputted from the reproduction equalizer 6 is supplied to the data detecting circuit 7 to be made into digital data by using a comparator or the like which selects a threshold level near a midpoint. The PLL circuit 9 generates a clock signal which is phase-locked to the reproduced digital data. The D-flip-flop 8 latches the reproduced digital data by using the clock signal.

The demodulator 10 demodulates the output of the D-flip-flop 8. The error correction decoding circuit 11 makes error correction. The reproduced signal processing circuit 12 performs a signal processing action in a manner which is almost reverse to a signal processing action performed in recording. The signal thus processed is supplied to the D/A converter 13. The D/A converter 13 D/A-converts the signal into a reproduced video signal, which is obtained at the output terminal 14.

Figure 4:
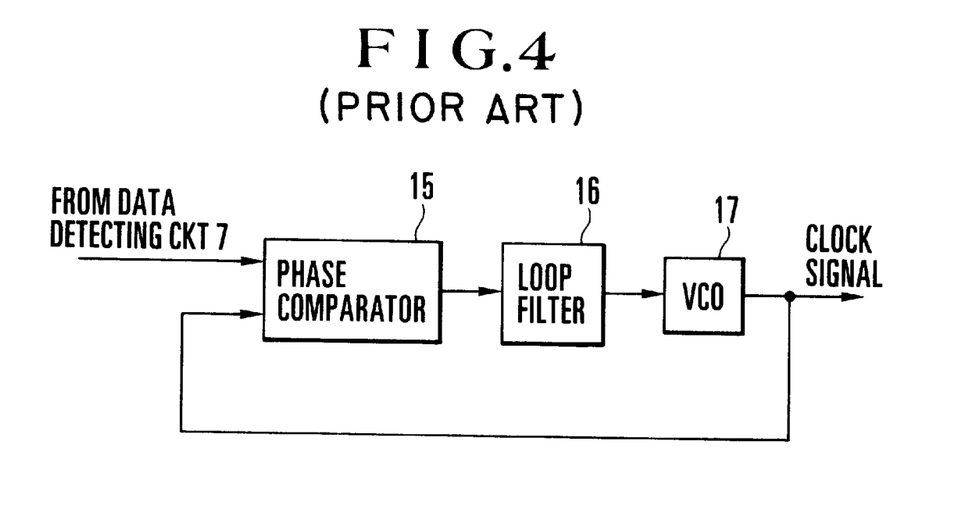
FIG. 4 shows the arrangement of a PLL circuit which is included in FIG. 2.
Figure 5:
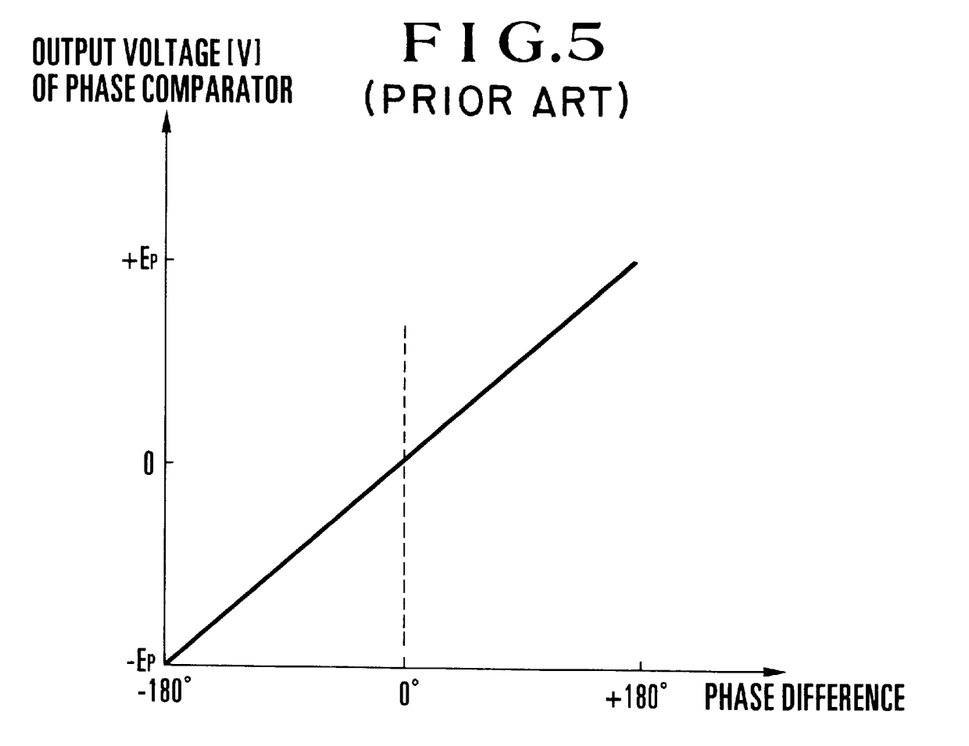
FIG. 5 shows the operation of the PLL circuit arranged as shown in FIG. 4.

The PLL circuit 9 is arranged and operates as follows. Referring to FIGS. 4 and 5, the PLL circuit 9 includes a phase comparator 15, a loop filter 16 and a voltage-controlled oscillator (hereinafter referred to as VCO) 17. The output of the data detecting circuit 7 is applied to one of the two input terminals of the phase comparator 15. A clock signal outputted from the VCO 17 is applied to the other input terminal of the phase comparator 15. The phase detecting characteristic of the phase comparator 15 is as follows. As shown in FIG. 5, when the phase of a second input signal advances with respect to a first input signal, the voltage of the output of the phase comparator 15 becomes larger.

When the signal phase of the reproduced digital data is caused to vary by unevenness of the rotation of the rotary drum 2 or by elongation or shrinkage of the magnetic tape 1, a phase difference between the clock signal and the reproduced digital data is detected by the phase comparator 15. Negative feedback of the result of detection is made to the VCO 17 through the loop filter 16 to use the result of detection for control over the oscillation frequency of the VCO 17, so that the clock signal can be phase-locked to the reproduced digital data by the negative feedback action.

Figure 6:
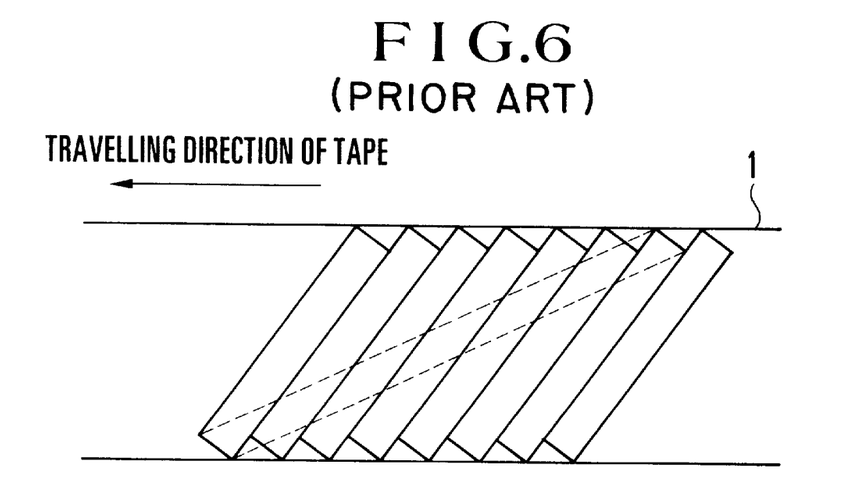
FIG. 6 shows tracing loci of heads obtained when the apparatus operates in a search mode.

With the digital VTR arranged as described above, in a special reproduction mode such as a high speed search mode, the magnetic heads 3a and 3b are caused to perform scanning by straddling several recording tracks in a manner as indicated by broken lines in FIG. 6. As a result, the length of scanning per turn of the rotary drum 2 increases to increase a speed at which the magnetic heads 3a and 3b scan the magnetic tape 1, i.e., the so-called relative speed.

To cope with such a state, it is conceivable to somewhat mitigate changes taking place in the relative speed by applying, to the servo circuit of the drum motor 2A, a roughly predetermined value corresponding to the multiple speed value of the high speed search.

However, according to this method, it is hardly possible to sufficiently mitigate the changes of the relative speed in the case of a high speed search to be made, for example, at a centuple-fold speed. In the event of such a high speed search, therefore, the PLL circuit 9 becomes incapable of carrying out a phase pull-in action, following the frequency variations of the reproduced data, and then all the reproduced data might become erroneous.

SUMMARY OF THE INVENTION

This invention is directed to the solution of the above-stated problems. It is, therefore, an object of this invention to provide an apparatus which is capable of obtaining a clock signal which is accurately phase-locked to a reproduced signal while following variations taking place in frequency of the reproduced signal, even in cases where a signal reproducing speed varies over a wide range.

Under this object, a reproducing apparatus which is arranged as an embodiment of this invention comprises: transport means for transporting a recording medium; reproducing means for reproducing a signal from the recording medium; generating means for generating a clock signal which is phase-locked to the signal reproduced by the reproducing means; phase-lock detecting means for detecting that the clock signal generated by the generating means is phase-locked to the signal reproduced by the reproducing means; and mode selection means for switching an operating mode of the apparatus among a plurality of modes. The plurality of modes include a normal reproduction mode in which the transport means transports the recording medium at a speed corresponding to a transport speed employed in recording and a special reproduction mode in which the transport means transports the recording medium at a speed different from the transport speed employed in the normal reproduction mode. The mode selection means is arranged to switch the normal reproduction mode over to the special reproduction mode in response to an output of the phase-lock detecting means.

It is another object of this invention to provide an apparatus which is capable of always obtaining an optimum equalizing characteristic and a clock signal accurately phase-locked to a reproduced signal, so that an adequately reproduced signal can be obtained, even when a signal reproducing speed varies.

Under that object, a digital VTR arranged as another embodiment of this invention to reproduce a digital video signal comprises: head means for reproducing from a magnetic tape a digital video signal having an amount of information compressed by block encoding, the head means including a rotary head arranged to trace the magnetic tape and a rotation control circuit arranged to control a rotating action of the rotary head; an equalizer arranged to equalize the digital video signal reproduced by the head means; PLL means for generating a clock signal which is phase-locked to the reproduced digital video signal, the PLL means including a phase comparator which detects a phase difference between the reproduced digital video signal and the clock signal, a loop filter which receives an output of the phase comparator and an oscillation circuit which outputs, as the clock signal, a signal of a frequency corresponding to an output of the loop filter; signal processing means for expanding the amount of information of the reproduced digital video signal by using the clock signal outputted from the PLL means; transport means for transporting the magnetic tape; mode selection means for switching the operating mode of the VTR among a plurality of modes including a normal reproduction mode in which the transport means transports the magnetic tape at a speed corresponding to a transport speed employed in recording and a special reproduction mode in which the transport means transports the magnetic tape at a speed different from the transport speed employed in the normal reproduction mode, the mode selection means being arranged to select the special reproduction mode through the normal reproduction mode in switching the operating mode over to the special reproduction mode; and equalizer control means for varying an equalizing characteristic of the equalizer in response to the operating mode being the special reproduction mode.

The above and other objects and features of this invention will become apparent from the following detailed description of embodiments thereof taken in conjunction with the accompanying drawings.

DETAILED DESCRIPTION OF THE PREFERRED EMBODIMENTS

An embodiment of this invention is described below with reference to the drawings.

Figure 7:
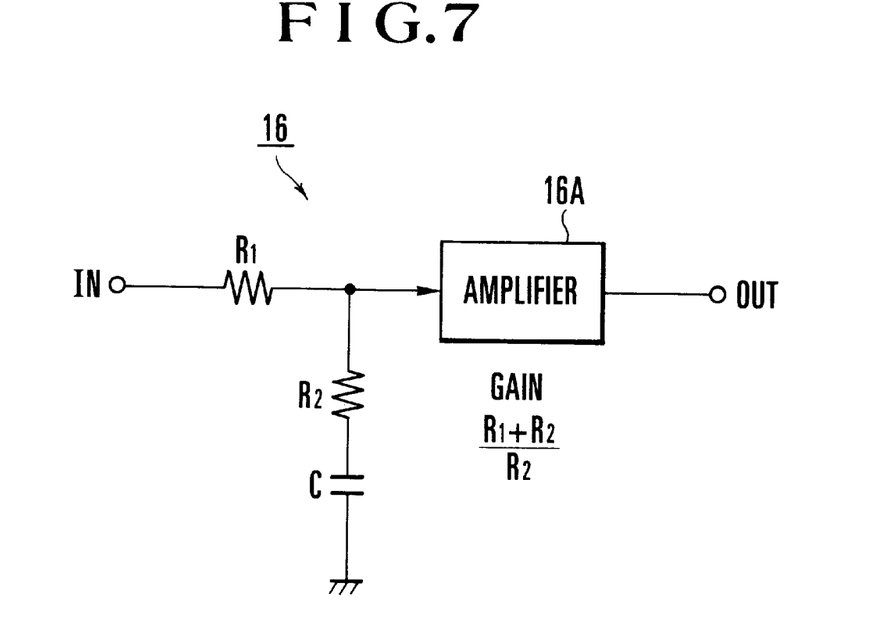
FIG. 7 shows the arrangement of a loop filter which is used for an embodiment of this invention.
Figure 8:
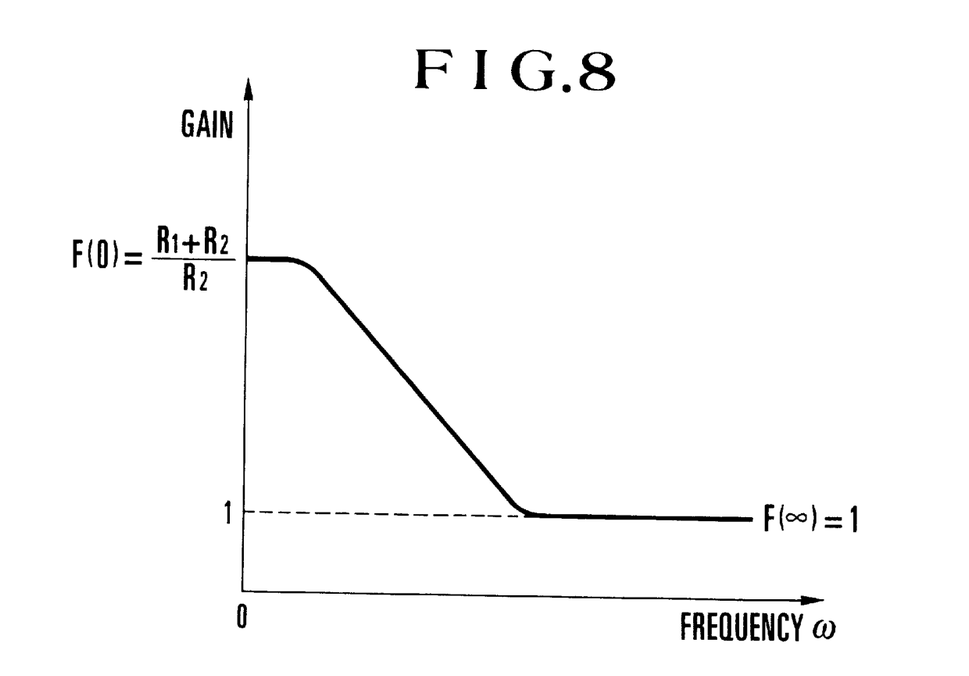
FIG. 8 shows the characteristic of the circuit shown in FIG. 7.

Before the description of the embodiment, the phase locking action of a PLL circuit 9 is first described as follows. FIG. 7 is a circuit diagram showing a lag-lead type secondary loop filter which is employed as a loop filter 16 in general. The amplitude characteristic of the loop filter 16 is illustrated in FIG. 8. As shown, when an amplifier 16A is added to cause the gain $F(\infty)$ of a high band to become "1", the gain $F(0)$ of DC becomes $F(0)=(R1+R2)/R2$. The ratio between the DC gain and the high band gain is assumed to be expressed as follows.

$$F(\infty)/F(0)=R2/(R1+R2)=m(m<1) \tag{1}$$

With a phase-locked state once obtained, when the frequency of an input signal deviates, a frequency range within which the PLL circuit 9 can cause the oscillating frequency of the VCO 17 to follow the deviation is called a lock range $\omega L$. Assuming that the maximum output voltage of a phase comparator 15 is $\pm Ep$ and the DC gain of the PLL loop which includes the frequency modulation sensitivity of the VCO 17 is $K \cdot F(0)$, the lock range can be expressed by the following formula:

$$|\omega L|=Ep \cdot K \cdot F(0) \tag{2}$$

Further, with an input signal applied to the PLL circuit 9 when the PLL circuit 9 is not in a phase-locked state, a frequency range within which the PLL circuit 9 can be pulled into a phase-locked state is called a lock-in range ωS. The lock-in range is a frequency range which corresponds to a high band loop gain and can be expressed by the following formula:

$$\omega S = E_p \cdot K \cdot F(\infty) = m \cdot \omega L \quad (3)$$

Since the DC gain F(0) of the loop filter 16 is set at a value two to four times as much as the high band gain F(∞) in most cases, the lock range ωL is two to four times as wide as the lock-in range ωS.

Figure 9:
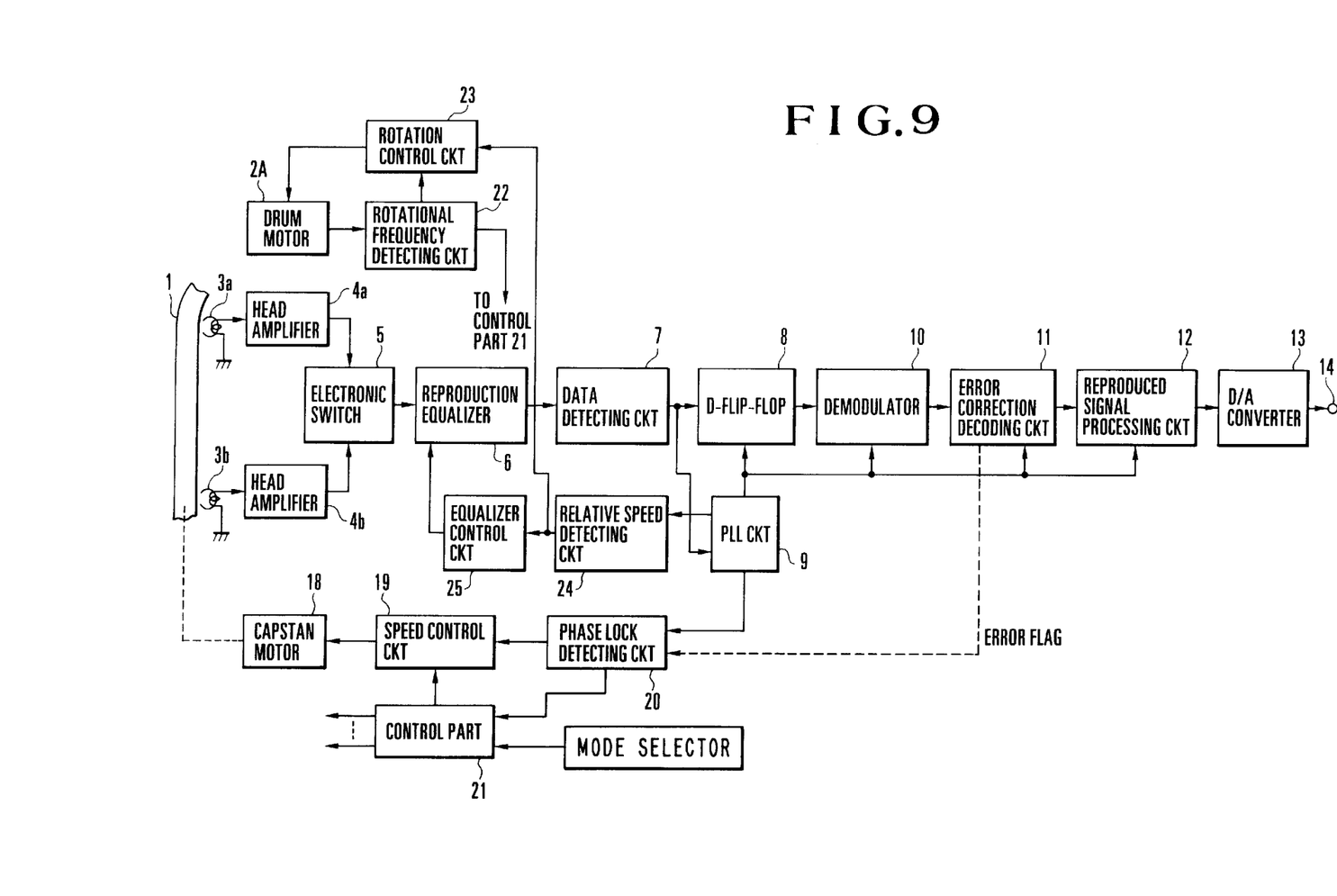
FIG. 9 is a block diagram showing the arrangement of a digital VTR which is arranged as an embodiment of this invention.

The embodiment of this invention is described with reference to FIG. 9. In FIG. 9, the same parts as those shown in FIG. 1 are indicated by the same reference numerals, and description of them is omitted. Referring to FIG. 9, a capstan motor 18 is arranged to cause the magnetic tape 1 to travel. A speed control circuit 19 is arranged to control the traveling speed of the tape 1 by carrying out a speed servo action on the capstan motor 18. A phase lock detecting circuit 20 is arranged to detect a phase-locked state of the PLL circuit 9 and to inform the speed control circuit 19 of the phase-locked state. A control part 21 is arranged to control the speed control circuit 19 and also to control other parts of the VTR.

A rotational frequency detecting circuit 22 is arranged to detect the rotational frequency of a drum motor 2A and to inform the control part 21 that the rotational frequency reaches a predetermined value. A rotation control circuit 23 is arranged to control the rotational frequency of the drum motor 2A according to the rotational frequency detected by the rotational frequency detecting circuit 22 by performing a drum servo action.

Figure 10:
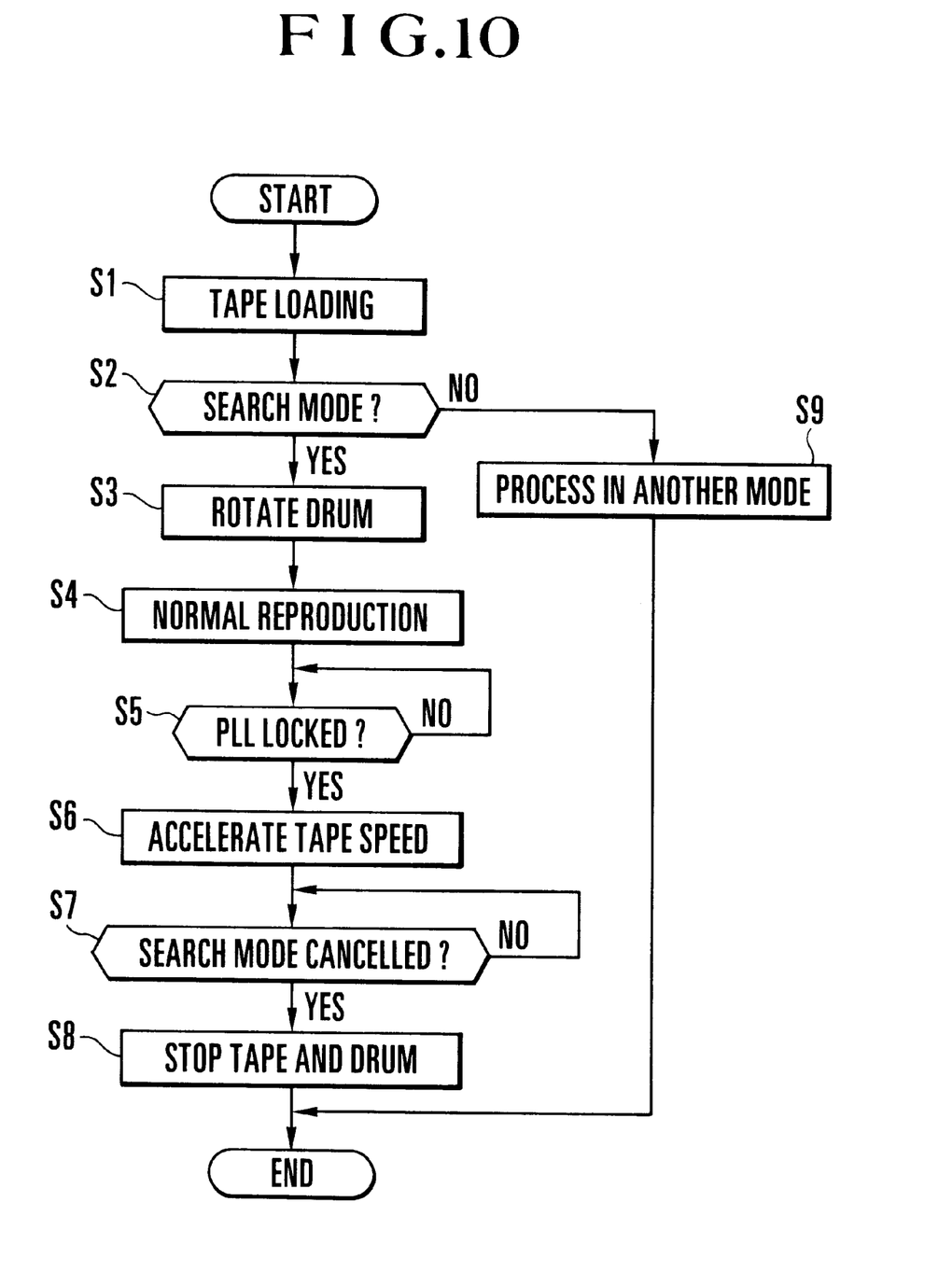
FIG. 10 is a flow chart showing the operation of the embodiment of this invention.

The operation of the embodiment is described with reference to the flow chart of FIG. 10 as follows. At a step S1, the VTR is loaded with the magnetic tape 1. At a step S2, a check is made for a high speed search mode, as by checking the state of the MODE SELECTOR of FIG. 9 as chosen by a user. If the step S2 inquiry is answered in the negative, i.e., there is no high speed search request, progress is to step S9 (PROCESS IN ANOTHER MODE). When a high speed search button which is not shown is pushed, the flow of operation comes to a step S3. At the step S3, the rotary drum 2 is caused to rotate. The flow waits until the rotation reaches a normal rotational frequency. When the normal rotational frequency is detected by the rotational frequency detecting circuit 22, the flow comes to a step S4. At the step S4, the control part 21 controls the speed control circuit 19 to cause the magnetic tape 1 to travel at a normal reproduction speed or a tape speed close to the normal reproduction speed, i.e., at a tape speed which is the same as a speed employed at the time of recording. The flow waits until the PLL circuit 9 is phase-locked to a reproduced signal. The phase lock detecting circuit 20 is arranged to detect that the PLL circuit 9 is phase-locked to the reproduced signal either by detecting that an input voltage supplied from the loop filter 16 to the VCO 17 reaches a value within a reference range or, for example, by detecting that the frequency-of generation of an error detection signal by the error correction decoding circuit 11 is less than a reference value. The phase-locked state thus can be detected by any of such methods without difficulty.

At a step S5, when the phase lock detecting circuit 20 detects that the PLL circuit 9 is phase-locked, the flow comes to a step S6. At the step S6, the speed control circuit 19 causes the traveling speed of the magnetic tape 1 to be accelerated while maintaining the phase-locked state. In this instance, the relative speed of the magnetic heads 3a and 3b with respect to the magnetic tape 1 varies. However, after the PLL circuit 9 is pulled into the phase-locked state, the embodiment is capable of following all frequency fluctuations as long as the frequency fluctuations of the clock signal are taking place within the lock range ωL. Therefore, reproduction in the special reproduction mode can be carried out within a wider range of tape speeds than the conventional VTR, so that a leader part of each record can be quickly located.

Further, in the event of a dropout due to a flaw of the magnetic tape 1 or the like, the embodiment is arranged to hold and use an input voltage of the VCO 17 obtained immediately before the dropout, so that the operation can be stably carried out.

Again referring to FIG. 10, at a step S7, a check is made to find if the high speed search (or special reproduction) mode is canceled. If so, the flow comes to a step S8. At the step S8, the drum motor 2A and the capstan motor 18 are stopped to bring the rotary drum 2 and the magnetic tape 1 to a stop.

As described above, the embodiment is arranged such that, in shifting to the high speed search mode, a reproducing operation is first performed at a tape travel speed close to the normal speed of reproduction for a predetermined period of time and, under this condition, the PLL circuit 9 is phase-locked to the reproduced signal before the traveling speed of the magnetic tape 1 is increased to the high speed of the high speed search mode. This arrangement enables the embodiment to phase-lock the PLL circuit 9 to the reproduced signal even in the event of a shift to the high speed search mode, so that images can be reproduced with a less amount of decoding errors.

While the embodiment has been described with respect to its operation to be performed in entering into the search mode after tape loading, various other modes of operation are conceivable.

Generally, a digital VTR has a memory arranged within a reproduced signal processing circuit. In a still image mode, a still image is obtained by repeatedly reading out a reproduced image signal written into the memory immediately before entering into the still mode. In this instance, the tape and the head can be prevented from deteriorating by stopping the head from rotating. In the case of a digital VTR, an image can be obtained by bringing the head to a stop in the still image mode as mentioned above. Hence, in shifting the operating mode from the still image mode to the search mode, for example, the head has been brought to a stop as mentioned above. Therefore, if the operation is shifted directly into the search mode, it might be impossible to obtain any reproduced data as no reproduction clock signal is obtained as mentioned in the foregoing.

In this case, a clock signal can be stably obtained for obtaining reproduced data by having a normal reproduction to be temporarily performed to phase-lock the PLL circuit before entering into the search mode.

Figure 11:
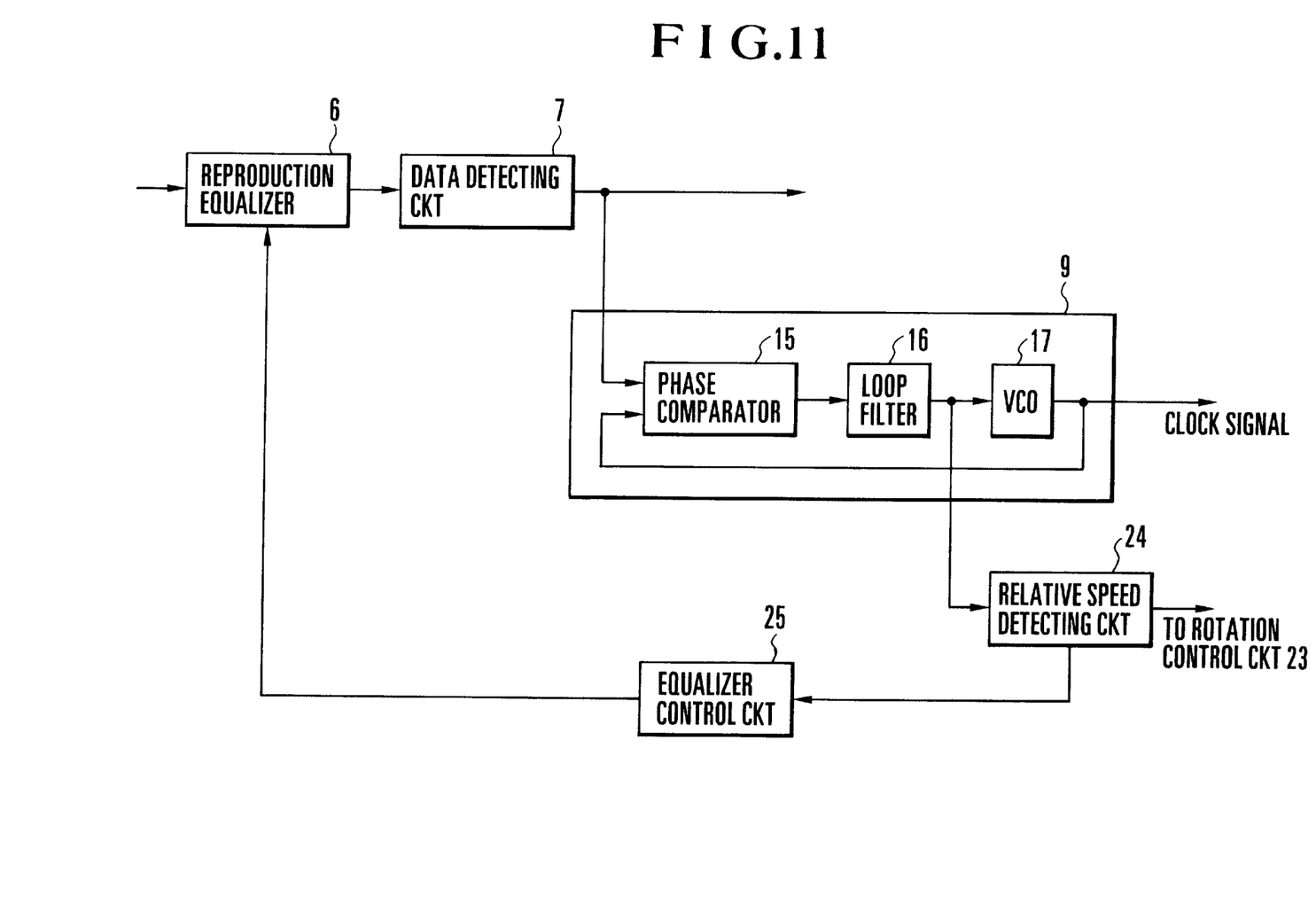
FIG. 11 is a block diagram showing the arrangement of the essential parts of FIG. 9.
Figure 12:
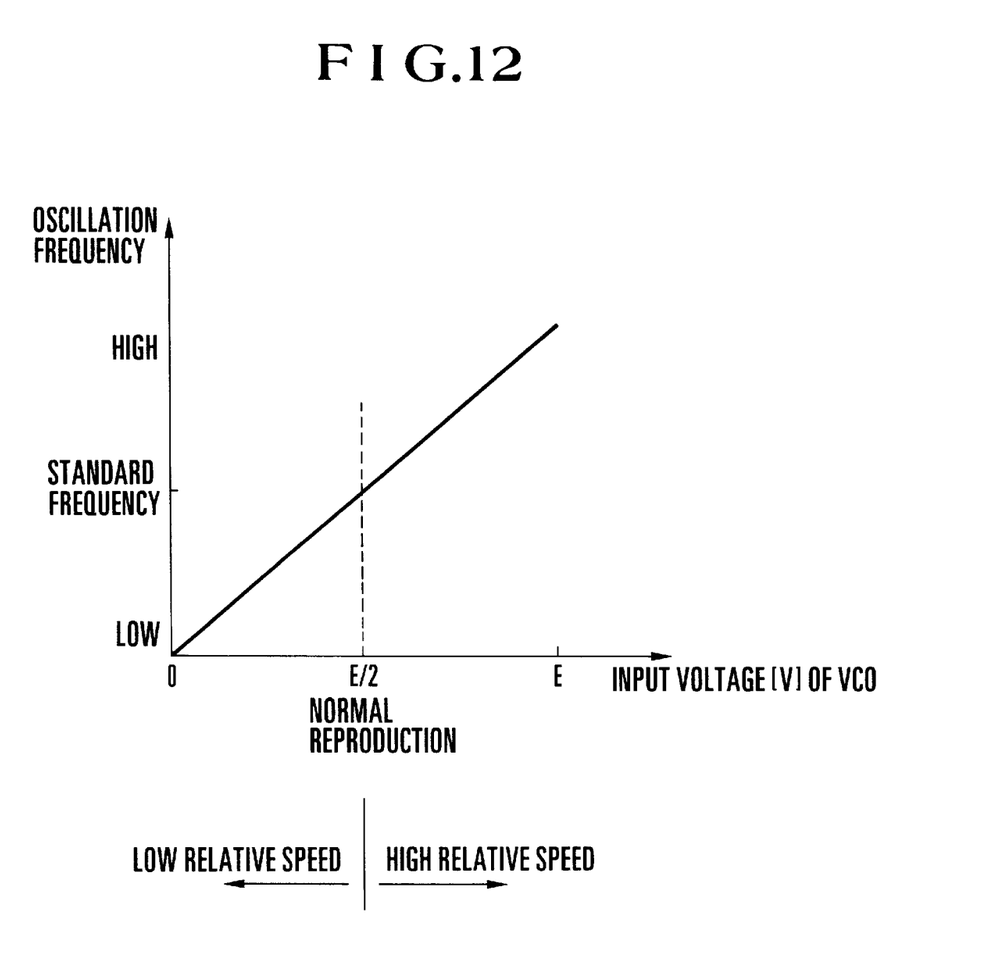
FIG. 12 shows the operation of the circuit shown in FIG. 11.

While the embodiment has been described by way of example as having the rotational frequency of the rotary drum 2 left constant, the embodiment may be arranged as shown in FIG. 11 to correct the rotational frequency of the rotary drum 2 by averaging the input voltage of the VCO 17 to obtain a central value, by arranging a relative speed detecting circuit 24 to detect, on the basis of the central value, the magnetic tape scanning speed of the magnetic heads 3a and 3b, i.e., the relative speed, as shown in FIG. 12, and by supplying the output of the relative speed detecting circuit 24 to the rotation control circuit 23. A speed range of special reproduction can be further broadened by this arrangement.

The embodiment has been described solely with respect to the action of the PLL circuit 9. However, if the above-stated relative speed changes, the tape-head system also changes its characteristic and then the frequency characteristic of the reproduction equalizer 6 comes to deviate from an optimum state. Therefore, if the reproduction equalizer 6 is controlled on the basis of the output of the relative speed detecting circuit 24, i.e., in response to its change to a search mode, the reproduced data can be obtained with a lesser amount of errors.

More specifically, the frequency characteristic of signals reproduced by the magnetic heads 3a and 3b is a differential characteristic for a low band and becomes an attenuating characteristic for a high band due to losses of varied kinds. Hence, the reproduction equalizer 6 which is of a characteristic reverse to that of the reproduced signal is arranged to correct the amplitude of the reproduced signal to make its frequency characteristic into a flat characteristic.

In the search mode, the frequency of the signal reproduced becomes high as mentioned in the foregoing. In other words, the frequency characteristic of the reproduced signal as a whole shifts to its high frequency side. Therefore, the reproduction equalizer is arranged to have an optimum equalizing characteristic to give adequate data by varying its characteristic according to changes taking place in the frequency characteristic of the reproduced signal.

The embodiment has been described as having a search mode in which a reproducing operation is performed by transporting the magnetic tape at a speed higher than a speed employed at the time of recording. However, it goes without saying that an advantageous effect similar to the advantage described in the foregoing is attainable by applying this invention to other modes such as a slow mode in which the magnetic tape is transported at a speed slower than the speed employed in recording.

What is claimed is:

1. A reproducing apparatus comprising:
    a) transport means for transporting a recording medium;
    b) reproducing means for reproducing a signal from the recording medium;
    c) a PLL circuit for generating a clock signal from the recording medium;
    d) phase-lock detecting means for detecting that the PLL circuit is phase-locked; and
    e) mode selection means for selecting an operating mode of the apparatus among a plurality of modes, said plurality of modes including a normal reproduction mode in which said transport means transports the recording medium at a speed corresponding to a transport speed employed in recording and said reproducing means reproduces the signal from the recording medium transported by said transport means and a search reproduction mode in which said transport means transports the recording medium at a speed different from the transport speed employed in the normal reproduction mode and said reproducing means reproduces the signal from the recording medium transported by said transport means, said mode selection means, in response to a request for the search reproduction mode, setting the operation mode of said apparatus to be the normal reproduction mode and thereafter setting the apparatus in the search reproduction mode in response to the phase-lock detecting means detecting that the PLL circuit is phase-locked.

2. An apparatus according to claim 1, wherein said PLL circuit includes a phase difference detecting circuit arranged to detect a phase difference between the reproduced signal and the clock signal, a loop filter arranged to receive an output of said phase difference detecting circuit, and an oscillation circuit arranged to output, as the clock signal, a signal of a frequency corresponding to an output of said loop filter.

3. An apparatus according to claim 2, wherein said phase-lock detecting means is arranged to perform a phase-locked state detecting action by using the output of said loop filter.

4. An apparatus according to claim 2, further comprising error detecting means for detecting an error in the reproduced signal, wherein said phase-lock detecting means is arranged to perform a phase-locked state detecting action by using an output of said error detecting means.

5. An apparatus according to claim 2, wherein said reproducing means includes a rotary head and a rotation control circuit for controlling a rotating action of said rotary head, said rotation control circuit being arranged to shift a rotating speed of said rotary head according to the output of said loop filter.

6. An apparatus according to claim 1, further comprising mode designating means for designating the operating mode, wherein, when the search reproduction mode is designated by said mode designating means, said mode selection means temporarily sets the apparatus in the normal reproduction mode and, after that, shifts the normal reproduction mode to the search reproduction mode in response to the output of said phase-lock detecting means.

7. A digital VTR for reproducing a digital video signal, comprising:
    a) head means for reproducing from a magnetic tape a digital video signal having an amount of information compressed by block encoding, said head means including a rotary head arranged to trace the magnetic tape and a rotation control circuit arranged to control a rotating action of said rotary head;
    b) an equalizer arranged to equalize the digital video signal reproduced by said head means;
    c) phase-lock detecting means including a PLL circuit for generating a clock signal, said PLL circuit including a phase comparator arranged to detect a phase difference between the reproduced digital video signal and the clock signal, a loop filter arranged to receive an output of said phase comparator and an oscillation circuit arranged to output, as the clock signal, a signal of a frequency corresponding to an output of said loop filter, said phase-lock detecting means detecting that the PLL circuit is phase locked;
    d) signal processing means for expanding the amount of information of the reproduced digital video signal by using the clock signal outputted from said PLL circuit;
    e) transport means for transporting the magnetic tape;
    f) mode setting means for setting an operating mode of the VTR among a plurality of modes, said plurality of modes including a normal reproduction mode in which said transport means transports the magnetic tape at a speed corresponding to a transport speed employed in recording and said head means reproduces the signal from the magnetic tape transported by said transport means and a search reproduction mode in which the magnetic tape is transported at a speed faster than the transport speed employed in the normal reproduction mode and said head means reproduces the signal from the magnetic tape transported by said transport means, said mode setting means, upon a request for the search reproduction mode, setting the operation mode of the apparatus to the normal reproduction mode and thereafter switching the operating mode over to the search reproduction mode in response to the phase-lock detecting means detecting that the PLL circuit is phase-locked; and g) equalizer control means for varying an equalizing characteristic of said equalizer in response to the operating mode being the search reproduction mode.

8. A reproducing apparatus, comprising:

a) transport means for transporting a recording medium;

b) reproducing means for reproducing a digital signal from the recording medium;

c) instructing means for instructing an operation mode of the apparatus among a plurality of modes, said plurality of modes including a normal reproduction mode in which said transport means transports the recording medium at a speed corresponding to a transport speed employed in recording and the reproducing means reproduces the digital signal from the recording medium transported by said transport means and a search reproduction mode in which said transport means transports the recording medium at a speed faster than the transport speed employed in the normal reproduction mode and the reproducing means reproduces the digital signal from the recording medium transported by said transport means;

d) clock signal generating means for generating a clock signal phase-synchronized with the signal obtained by said reproducing means;

e) phase-lock detecting means for detecting that the clock signal is phase-synchronized with the signal obtained by said reproducing means; and f) mode setting means for setting the operation mode of the apparatus in response to an instruction of said instructing means, said mode setting means, upon receiving an instruction for the search reproduction from said mode instruction means, setting the operation mode of the apparatus to the normal reproduction mode and thereafter switching the operation mode over to the search reproduction mode in response to the phase-lock detecting means detecting that the clock signal is phase-synchronized with the signal obtained by said reproducing means.

9. An apparatus according to claim 8, wherein said clock generating means comprises a PLL circuit for generating the clock signal.

10. An apparatus according to claim 9, wherein said PLL circuit includes a phase difference detecting circuit for detecting a phase difference between said digital signal and said clock signal, a loop filter for filtering an output from said phase difference detecting circuit and an oscillator for outputting a signal as said clock signal in response to an output of said loop filter.

11. An apparatus according to claim 10, wherein said reproducing means includes an equalizer for equalizing digital signals obtained by said head, the equalizing characteristics of said equalizer changing in response to an output of said loop filter.

12. An apparatus according to claim 9, wherein said reproducing means comprises head means for picking up a signal from the recording medium and detection means for detecting the digital signal from the signal picked up by said head means according to the clock signal.

13. An apparatus according to claim 8, wherein said reproducing means comprises rotary head means and head control means for controlling a rotation speed of said rotary head means according to the operation mode of the apparatus.

14. A reproducing apparatus, comprising:

moving means for moving a recording medium;

reproducing means for reproducing a signal from the recording medium;

a PLL circuit for generating a clock signal using the signal reproduced by said reproducing means;

phase-lock detecting means for detecting that the PLL circuit is phase-locked;

control means for controlling said moving means to change a moving speed of the recording medium, said control means changing the moving speed from a first moving speed to a second moving speed faster than the first moving speed in response to the phase-lock detecting means detecting that the PLL circuit is phase-locked.

15. An apparatus according to claim 14, further comprising an instruction member, said control means setting the moving speed to the first moving speed in response to an instruction of said instruction member and thereafter changing the moving speed to the second moving speed according to an output of said phase-lock detecting means.

16. An apparatus according to claim 14, wherein said phase-lock detecting means comprises error detection means for correcting errors in the reproduced signal and for detecting the errors which cannot be corrected, and wherein said phase-lock detecting means detects that the PLL circuit is phase-locked according to an output of said error detection means.

* * * * *